United States Patent
Yoshida et al.

(10) Patent No.: US 12,408,668 B2
(45) Date of Patent: Sep. 9, 2025

(54) STABLE MICROBICIDE COMPOSITION

(71) Applicant: CHEMICREA INC., Chuo-ku (JP)

(72) Inventors: Takamasa Yoshida, Iwaki (JP); Tomoaki Noguchi, Iwaki (JP); Naoto Taguchi, Iwaki (JP); Shingo Kajiyama, Chuo-ku (JP)

(73) Assignee: CHEMICREA INC., Chuo-ku (JP)

( * ) Notice: Subject to any disclaimer, the term of this patent is extended or adjusted under 35 U.S.C. 154(b) by 0 days.

(21) Appl. No.: 17/615,694

(22) PCT Filed: Jun. 2, 2020

(86) PCT No.: PCT/JP2020/021718
§ 371 (c)(1),
(2) Date: Dec. 1, 2021

(87) PCT Pub. No.: WO2020/246452
PCT Pub. Date: Dec. 10, 2020

(65) Prior Publication Data
US 2022/0202015 A1    Jun. 30, 2022

(30) Foreign Application Priority Data

Jun. 3, 2019 (JP) .................. 2019-103461
Aug. 13, 2019 (JP) .................. 2019-148626

(51) Int. Cl.
| | |
|---|---|
| *A01N 43/80* | (2006.01) |
| *A01N 25/22* | (2006.01) |
| *A01N 43/40* | (2006.01) |
| *A01P 1/00* | (2006.01) |

(52) U.S. Cl.
CPC ............. *A01N 43/80* (2013.01); *A01N 25/22* (2013.01); *A01N 43/40* (2013.01); *A01P 1/00* (2021.08)

(58) Field of Classification Search
CPC .................. A01N 43/80; A01N 25/22
See application file for complete search history.

(56) References Cited

U.S. PATENT DOCUMENTS

| | | |
|---|---|---|
| 4,241,214 A | 12/1980 | Miller et al. |
| 4,824,957 A | 4/1989 | Amick |
| 5,242,893 A | 9/1993 | Willingham |
| 5,424,324 A | 6/1995 | Willingham |
| 5,559,083 A | 9/1996 | Kubota et al. |
| 6,429,220 B1 | 8/2002 | Yagi et al. |
| 6,437,020 B1 | 8/2002 | Amick et al. |
| 2001/0048950 A1 | 12/2001 | A'mma |
| 2002/0115765 A1 | 8/2002 | Amick et al. |
| 2008/0299225 A1 | 12/2008 | Funatsu |
| 2014/0087978 A1* | 3/2014 | Deville ............... C07F 9/5407 568/426 |

FOREIGN PATENT DOCUMENTS

| | | | |
|---|---|---|---|
| CN | 1316879 | A | 10/2001 |
| CN | 106342802 | * | 1/2017 |
| EP | 0 166 611 | A2 | 1/1986 |
| EP | 0 194 146 | A2 | 9/1986 |
| JP | 61-56174 | A | 3/1986 |
| JP | 61-212576 | A | 9/1986 |
| JP | 3-206085 | A | 9/1991 |
| JP | 5-132404 | A | 5/1993 |
| JP | 7-82108 | A | 3/1995 |
| JP | 7-324007 | A | 12/1995 |
| JP | 2000-128716 | A | 5/2000 |
| JP | 2000-143413 | A | 5/2000 |
| JP | 2005-89348 | A | 4/2005 |
| JP | 2008-156243 | A | 7/2008 |
| JP | 4942250 | B2 | 5/2012 |
| KR | 10-2006-0070622 | A | 6/2006 |
| WO | WO99/15512 | A1 | 4/1999 |
| WO | WO 2008/146436 | A1 | 12/2008 |

OTHER PUBLICATIONS

Mei (CN 106342802; published: Jan. 25, 2017), English translation obtained on Jul. 29, 2022 (Year: 2022).*
Combined Chinese Office Action and Search Report issued on May 16, 2022 in Chinese Patent Application No. 202080041113.X (with English translation of Office Action only), citing references AA and AO-AP therein, 11 pages.
International Search Report issued on Aug. 25, 2020 in PCT/JP2020/021718 filed on Jun. 2, 2020, citing documents AF-AI and AR-AX therein, 3 pages.
Extended European Search Report(EESR) issued on Jun. 23, 2022 for European Patent Application No. 20818468.9.
Anonymous:"Tempo-Wikipedia", Apr. 28, 2018, XP93054538A, Retrieved from the Internet:URL:https://en.wikipedia.org/w/index.php?title=TEMPO&oldid=838661083[retrieved on Jun. 14, 2023].

* cited by examiner

*Primary Examiner* — Genevieve S Alley
(74) *Attorney, Agent, or Firm* — Oblon, McClelland, Maier &Neustadt, L.L.P.

(57) ABSTRACT

Provided is a microbicide-containing aqueous composition having a superior effect of stabilizing 5-chloro-2-methyl-4-isothiazolin-3-one. This microbicide composition includes: (A) 5-chloro-2-methyl-4-isothiazolin-3-one; (B) 2,2,6,6-tetramethylpiperidin-1-oxyl; and (C) at least one solvent selected from the group consisting of water and a hydrophilic organic solvent.

10 Claims, No Drawings

STABLE MICROBICIDE COMPOSITION

FIELD OF THE INVENTION

The present invention relates to a stable microbicide composition.

BACKGROUND OF THE INVENTION

Dispersion products (e.g., adhesives, resin emulsions, inks, pastes, coating materials, papers, fibers, building materials), or dispersion systems or cooling towers in a manufacturing process thereof, for example, contain organic compounds and/or inorganic materials. They are nutrient sources, and microorganisms (e.g., bacteria, yeast, fungi, algae) thus grow. This causes a decrease in the quality and productivity of the products or causes, for instance, occurrence of infectious diseases. As microbicides against these problems, isothiazolone-based compounds have been used. Among these isothiazolone-based compounds, 5-chloro-2-methyl-4-isothiazolin-3-one is widely used because it exhibits a microbicidal action against a wide range of microorganisms.

Unfortunately, 5-chloro-2-methyl-4-isothiazolin-3-one (hereinafter, referred to as CMI), by itself, is very unstable in water, and is decomposed when prepared as an aqueous solution formulation. In order to solve such a problem, various studies have been conducted. For example, a means for adding an alcohol (e.g., propylene glycol), an unsaturated carbonyl compound (e.g., crotonic acid), or an organic compound (e.g., polyamine or haloacetamide) is known (Patent Literatures 1 to 6 or ZONEN-FP, manufactured by Chemicrea). Nevertheless, it cannot be said that the CMI stabilization effect can be exerted sufficiently by addition of each organic compound.

Meanwhile, microbicides (ZONEN-C, manufactured by Chemicrea; KATHON WT, manufactured by Dow DuPont), in which magnesium nitrate and magnesium chloride are blended to store and stabilize CMI in an aqueous solvent, have been commercially distributed. However, in the case of adding each microbicide to a latex emulsion or each resin emulsion phase, which is part of target uses, the problem is that the emulsion phase is broken due to the presence of a metal salt such as a magnesium salt, and as a result of which phase separation and/or coagulation occurs (what is called emulsion shock). Also, it is well-known that nitrate ions serve as a nutrient source for microorganisms. From the viewpoint of preventing water resource pollution, the Water Contamination Prevention Act has recently been revised to make it mandatory for the installer of a facility where a nitrate (e.g., magnesium nitrate) or a mixture thereof is, for instance, used and stored to comply with the standards for structures, facilities, and methods of use for preventing underground infiltration, to perform periodic inspections, and to record and store the results. This may restrict the use. Further, since a large amount of magnesium nitrate is used to exert a practically sufficient CMI stabilization effect, the product cost is increased. Thus, there is a need to develop a microbicide free of a metal salt such as a magnesium salt.

In addition, Patent Literature 7 discloses a means for adding, for example, 4-hydroxy-2,2,6,6-tetramethylpiperidinoxyl or diethylhydroxylamine as a CMI storage stabilizer. However, such a stabilizer alone cannot produce a practically sufficient CMI stabilization effect, and the CMI stabilization effect can be obtained only by combination with a halide such as a bromate. This literature fails to describe a practically sufficient CMI stabilization effect exerted by 4-hydroxy-2,2,6,6-tetramethylpiperidinoxyl or diethylhydroxylamine alone. In addition, bromic acid is a chemical that is found to be highly mutagenic, and its use and discharge should be restricted. Further, if a halide is blended in a product, the cost is increased. Thus, it is undesirable to use the halide.

As another CMI storage stabilization means, it is known to add copper ions (Patent Literature 8). However, copper ions are environmental contaminants. Thus, the effluent standard is set to 3 mg/L or less in the Water Contamination Prevention Act. This may also restrict the use.

CITATION LIST

Patent Literature

Patent Literature 1: JP 61-56174 A
Patent Literature 2: JP 61-212576 A
Patent Literature 3: JP 3-206085 A
Patent Literature 4: JP 2008-156243 A
Patent Literature 5: JP 2005-89348 A
Patent Literature 6: WO 2008/146436
Patent Literature 7: U.S. Pat. No. 6,437,020
Patent Literature 8: JP 4942250 B2

SUMMARY OF THE INVENTION

Technical Problem

The present invention addresses the problem of providing an inexpensive microbicide composition that is free of a metal salt (e.g., magnesium nitrate, copper) or a halogen acid or a salt thereof (e.g., a bromate), which is a substance having a concern of a load on the human body and the environment, has an excellent microbicidal action by CMI and other microbicide(s) and superior CMI storage stability, and is applicable to a wide range of applications because a substance for causing emulsion shock is not contained.

Solution to Problem

Here, the present inventors added various components to CMI and examined the stability, microbicidal action, and usability. Then, it was found that water and/or a hydrophilic organic solvent is used as a solvent and a small amount of 2,2,6,6-tetramethylpiperidin-1-oxyl is blended to exert a remarkable CMI stabilization effect, produce a sufficient microbicidal effect, and further causing no emulsion shock. In this way, the present invention was completed.

Specifically, the invention provides the following [1] to [11].

[1] A microbicide composition comprising: (A) 5-chloro-2-methyl-4-isothiazolin-3-one; (B) 2,2,6,6-tetramethylpiperidin-1-oxyl; and (C) at least one solvent selected from the group consisting of water and a hydrophilic organic solvent.

[2] The microbicide composition according to [1], further comprising (D) 2-methyl-4-isothiazolin-3-one.

[3] The microbicide composition according to [1] or [2], further comprising (E) at least one component selected from the group consisting of 1,2-benzisothiazolin-3-one, 2-n-octyl-4-isothiazolin-3-one, N-n-butyl-1,2-benzisothiazolin-3-one, 4,5-dichloro-2-n-octyl-4-isothiazolin-3-one, 2-bromo-2-nitropropane-1,3-diol, 2,2-dibromo-3-nitrilopropionamide, 2,2-dibromo-2-nitroethanol, 3-iodo-2-propynyl N-butylcarbamate, methylene dithiocyanate, 4,5-dichloro-3H-1,2-dithiol- 3-one, 1,2-bis(bromoacetoxy)ethane, 1,4-bis(bromoacetoxy)-2-butene, 1,2-bis(bromoacetoxy)propane, 2-(4-thiazolyl)benzimidazole, 2-(methoxycarbonylamino)-1H-benzimidazole, 1,3-bis(hydroxymethyl)-5,5-dimethylhydantoin, 1-bromo-3-chloro-5,5-dimethylhydantoin, 2-mercaptopyridine N-oxide zinc salt, 2-mercaptopyridine N-oxide sodium salt, glutaraldehyde, orthophthalaldehyde, hydrazine, α-chlorobenzaldehyde oxime, dichloroglyoxime, 1,3,5-triazin-1,3,5(2H,4H,6H)-tris(ethanol), maleimide, 3,3,4,4-tetrachlorotetrahydrothiophen-1,1-dioxide, benzalkonium chloride, a combination of ammonium sulfate and sodium hypochlorite, a combination of ammonium sulfate and potassium hypochlorite, a combination of ammonium bromide and sodium hypochlorite, a combination of ammonium bromide and potassium hypochlorite, benzoic acid, salicylic acid, and dehydroacetic acid.

[4] The microbicide composition according to any one of [1] to [3], wherein the component (A) has a content of from 0.0005 to 15 mass %, the component (B) has a content of from 0.000005 to 1.5 mass %, and the component (C) has a content of from 70 to 99.9995 mass %.

[5] The microbicide composition according to any one of [2] to [4], wherein the component (D) has a content of from 0.0001 to 50 mass %.

[6] A stabilizer for a composition comprising 5-chloro-2-methyl-4-isothiazolin-3-one and at least one solvent selected from the group consisting of water and a hydrophilic organic solvent, the stabilizer comprising 2,2,6,6-tetramethylpiperidin-1-oxyl as an active ingredient.

[7] The stabilizer according to [6], wherein the composition further comprises 2-methyl-4-isothiazolin-3-one.

[8] A method for stabilizing a composition comprising 5-chloro-2-methyl-4-isothiazolin-3-one and at least one solvent selected from the group consisting of water and a hydrophilic organic solvent, the method comprising adding 2,2,6,6-tetramethylpiperidin-1-oxyl to the composition.

[9] The stabilization method according to [8], wherein the composition further comprises 2-methyl-4-isothiazolin-3-one.

[10] A microbicidal method comprising adding the microbicide composition according to any one of [1] to [5] to a microbicide target.

[11] The microbicidal method according to [10], wherein the added amount is an amount provided such that the component (A) has a concentration of from 5 to 1000 ppm in the microbicide composition.

Advantageous Effects of the Invention

The microbicide composition of the invention makes it possible to suppress decomposition of CMI as an active ingredient in a solution, and elicit an excellent microbicidal action. Since the added amount of 2,2,6,6-tetramethylpiperidin-1-oxyl used as a stabilizer may be small, the microbicide composition of the invention causes no emulsion shock, does not become a nutrient source for microorganisms, is inexpensive, and has no problem in terms of stability.

DESCRIPTION OF EMBODIMENTS

A microbicide composition of the invention has a feature of comprising (A) CMI, (B) 2,2,6,6-tetramethylpiperidin-1-oxyl, and (C) at least one solvent selected from the group consisting of water and a hydrophilic organic solvent.

(A) CMI (component (A)) is an active ingredient as a microbicide in the microbicide composition of the invention, and has been widely and conventionally used as an industrial microbicide.

From the viewpoint of the microbicidal effect and stability, the component (A) in the microbicide composition of the invention has a content of preferably from 0.0005 to 15 mass %, more preferably from 0.0007 to 13 mass %, and still more preferably from 0.0008 to 12 mass %.

The microbicide composition of the invention may be used as it is or may be added to a water-containing liquid upon use. As described above, since the composition may be diluted with water and used, the content of each component is an amount after both the concentration upon use and the concentration in the formulation are considered.

The microbicide composition of the invention preferably contains (D) 2-methyl-4-isothiazolin-3-one in addition to the component (A) from the viewpoint of exerting a better microbicidal effect.

From the viewpoint of the microbicidal effect, the component (D) in the microbicide composition of the invention has a content of preferably from 0 to 50 mass %, more preferably from 0.0001 to 50 mass %, and still more preferably from 0.0002 to 50 mass %.

From the viewpoint of exerting a better microbicidal effect, the microbicide composition of the invention preferably further contains an additional microbicide (E) in addition to the components (A) and (D). Examples of such a component (E) include at least one component selected from the group consisting of 1,2-benzisothiazolin-3-one, 2-n-octyl-4-isothiazolin-3-one, N-n-butyl-1,2-benzisothiazolin-3-one, 4,5-dichloro-2-n-octyl-4-isothiazolin-3-one, 2-bromo-2-nitropropane-1,3-diol, 2,2-dibromo-3-nitrilopropionamide, 2,2-dibromo-2-nitroethanol, 3-iodo-2-propynyl N-butylcarbamate, methylene dithiocyanate, 4,5-dichloro-3H-1,2-dithiol-3-one, 1,2-bis(bromoacetoxy)ethane, 1,4-bis(bromoacetoxy)-2-butene, 1,2-bis(bromoacetoxy)propane, 2-(4-thiazolyl)benzimidazole, 2-(methoxycarbonylamino)-1H-benzimidazole, 1,3-bis(hydroxymethyl)-5,5-dimethylhydantoin, 1-bromo-3-chloro-5,5-dimethylhydantoin, 2-mercaptopyridine N-oxide zinc salt, 2-mercaptopyridine N-oxide sodium salt, glutaraldehyde, orthophthalaldehyde, hydrazine, α-chlorobenzaldehyde oxime, dichloroglyoxime, 1,3,5-triazin-1,3,5(2H,4H,6H)-tris(ethanol), maleimide, 3,3,4,4-tetrachlorotetrahydrothiophen-1,1-dioxide, benzalkonium chloride, a combination of ammonium sulfate and sodium hypochlorite, a combination of ammonium sulfate and potassium hypochlorite, a combination of ammonium bromide and sodium hypochlorite, a combination of ammonium bromide and potassium hypochlorite, benzoic acid, salicylic acid, and dehydroacetic acid.

Each component (E) is a component conventionally used as a microbicide, and commercially available products may be used.

It is also known that each component (E) may be used in combination with the component (A), but it is unknown that the component (A) in the composition containing the components (A), (E), and (C) is stabilized by the component (B) below.

Preferable examples of the component (E) include at least one compound selected from the group consisting of 1,2-benzisothiazolin-3-one, 2-n-octyl-4-isothiazolin-3-one, N-n-butyl-1,2-benzisothiazolin-3-one, 4,5-dichloro-2-n-octyl-4-isothiazolin-3-one, 2-bromo-2-nitropropane-1,3-diol, 2,2-dibromo-3-nitrilopropionamide, 2,2-dibromo-2-nitroethanol, 3-iodo-2-propynyl N-butylcarbamate, methylene dithiocyanate, 1,2-bis(bromoacetoxy)ethane, 2-(4-thiazolyl) benzoimidazole, 1-bromo-3-chloro-5,5-dimethylhydantoin, 2-mercaptopyridine N-oxide zinc salt, glutaraldehyde, hydrazine, dichlorooxime, 1,3,5-triazine-1,3,5(2H,4H,6H)-tris (ethanol), maleimide, benzalkonium chloride, a combination of ammonium sulfate and sodium hypochlorite, a combination of ammonium bromide and sodium hypochlorite, and benzoic acid.

More preferable examples include at least one compound selected from the group consisting of 1,2-benzisothiazolin-3-one, 4,5-dichloro-2-n-octyl-4-isothiazolin-3-one, 2-bromo-2-nitropropane-1,3-diol, 2,2-dibromo-2-nitroethanol, 3-iodo-2-propynyl N-butylcarbamate, 2-(4-thiazolyl) benzimidazole, glutaraldehyde, hydrazine, benzalkonium chloride, a combination of ammonium sulfate and sodium hypochlorite, a combination of ammonium bromide and sodium hypochlorite, and benzoic acid.

The content of the component (E) in the microbicide composition of the invention may be any amount that exerts a microbicidal action, varies depending on the type of the component (E), and is more preferably from 0.0001 to 40 mass % and still more preferably from 0.0002 to 30 mass %.

Here, 2,2,6,6-tetramethylpiperidin-1-oxyl (component (B)) acts as a stabilizer for the component (A) in the microbicide composition of the invention. Here, the stabilization refers to preventing decomposition of the component (A) when a solution containing the component (A) is stored for a long period of time, and preventing a change in appearance (occurrence of precipitation and coloration) of the solution.

The stabilizing action of 2,2,6,6-tetramethylpiperidin-1-oxyl is much better than the action of 4-hydroxy-2,2,6,6-tetramethylpiperidinoxyl, which is an analogue, as demonstrated in Examples below.

The component (B) 2,2,6,6-tetramethylpiperidin-1-oxyl is widely known as, in short, TEMPO, and commercially available products can be obtained.

From the viewpoint of the component (A) stabilization effect, the component (B) in the microbicide composition of the invention has a content of preferably from 0.000005 to 1.5 mass %, more preferably from 0.000005 to 1.0 mass %, and still more preferably from 0.00001 to 0.5 mass %.

The solvent (C) in the microbicide composition of the invention is at least one solvent selected from the group consisting of water and a hydrophilic organic solvent.

When water is used as the solvent, the composition of the invention is widely applicable as a microbicide in a water system. Examples of the water used include tap water, ion-exchanged water, distilled water, or industrial water.

As described above, the component (A) alone is very unstable in water. Thus, it is particularly preferable that the component (C) is water in the microbicide composition of the invention.

Examples of the hydrophilic organic solvent include a polyol (e.g., an alkylene oxide glycol (e.g., ethylene glycol, diethylene glycol, polyethylene glycol, propylene glycol, dipropylene glycol, polypropylene glycol), an alkanediol (e.g., 1,3-butanediol, 1,4-pentanediol, 1,5-pentanediol), or an alkanetriol (e.g., glycerol)); a glycol ether (e.g., methyl cellosolve, phenyl cellosolve, diethylene glycol monomethyl ether, dipropylene glycol monomethyl ether, diethylene glycol dimethyl ether); a (C1-C4) alkyl ester of acetic acid or propionic acid (e.g., methyl acetate, ethyl acetate, ethyl propionate, butyl acetate); an alkylene carbonate (e.g., ethylene carbonate, propylene carbonate); a (C2-C4) alcohol (e.g., ethanol, n-propanol, isopropanol, n-butanol, isobutyl alcohol, sec-butyl alcohol, Cert-butyl alcohol); a ketone (e.g., acetone, methyl ethyl ketone, methyl isobutyl ketone, isophorone); or dimethylformamide, dimethylacetamide, dimethylsulfoxide, dioxane, or N-methylpyrrolidone.

Among these hydrophilic organic solvents, for example, a polyol, a glycol ether, a C1-C4 alkyl ester of acetic acid, a C1-C4 ester of propionic acid, an alkylene carbonate, or a C2-C4 alcohol is preferable. A glycol-based solvent is more preferable from the viewpoint of the component (A) stabilization effect.

Examples of the glycol-based solvent include a glycol or a glycol ether. Among them, preferable examples include one or two or more glycol-based solvents selected from the group consisting of ethylene glycol, diethylene glycol, polyethylene glycol, ethylene glycol ether, diethylene glycol ether, polyethylene glycol ether, propylene glycol, dipropylene glycol, polypropylene glycol, propylene glycol ether, dipropylene glycol ether, and polypropylene glycol ether.

The polyethylene glycol used may be polyethylene glycol that is liquid at room temperature (5 to 35° C.), and polyethylene glycol having an average molecular weight of 200 to 800 is preferable.

Examples of the ethylene glycol ether include ethylene glycol monoalkyl ether or ethylene glycol dialkyl ether. Specific examples thereof include ethylene glycol monomethyl ether (methyl cellosolve), ethylene glycol monoethyl ether (ethyl cellosolve), ethylene glycol monobutyl ether (butyl cellosolve), ethylene glycol dimethyl ether (monoglyme), or ethylene glycol diethyl ether (ethyl glyme).

Examples of the diethylene glycol ether include diethylene glycol monoalkyl ether or diethylene glycol dialkyl ether. Specific examples thereof include diethylene glycol monomethyl ether (methyl carbitol), diethylene glycol monoethyl ether (ethyl carbitol), diethylene glycol monobutyl ether (butyl carbitol), diethylene glycol dimethyl ether (diglyme), diethylene glycol diethyl ether (diethyl carbitol), or diethylene glycol dibutyl ether (dibutyl carbitol).

Examples of the polyethylene glycol ether include polyethylene glycol monoalkyl ether that is liquid at room temperature (5 to 35° C.) or polyethylene glycol dialkyl ether that is liquid at room temperature (5 to 35° C.) Specific examples thereof include triethylene glycol dimethyl ether (triglyme) or tetraethylene glycol dimethyl ether (tetraglyme).

From the viewpoint of the solubility and stability of the component (A), the component (C) in the microbicide composition of the invention has a content of preferably from 70 to 99.9995 mass %, more preferably from 80 to 99.9995 mass %, and still more preferably from 85 to 99.9995 mass %.

The component (C) used may be either water or a hydrophilic organic solvent, or they may be used in combination. When water and a hydrophilic organic solvent are used in combination, the usage mass ratio therebetween may be 0.1/99.9 to 99.9/0.1, and is preferably 1/99 to 99/1. In the case of using the microbicide composition of the invention in an aqueous system such as a cooling tower, the usage mass ratio between water and the hydrophilic organic solvent (water/hydrophilic organic solvent) is preferably from 50/50 to 100/0, more preferably from 60/40 to 100/0, still more preferably from 80/20 to 100/0, and still more preferably from 90/10 to 100/0.

In addition, as long as the effects of the invention are not hindered, the microbicide composition of the invention may further contain, for example, a salt other than nitrate (e.g., sodium chloride, potassium chloride), a given stabilizer, a surfactant, and/or a buffer, depending on the use form and/or the target system.

From the viewpoint of the CMI storage stability, the microbicide composition of the invention has a pH of preferably from 1.0 to 7.0, more preferably from 1.5 to 5.0, and still more preferably from 2.0 to 4.0.

The microbicide composition of the invention may be produced by mixing the above components and dissolving them in water and/or a hydrophilic organic solvent.

The composition of the invention may be suitably used for, but not limited to, water for papermaking processes in the paper and pulp industry, pulp slurries, cooling water and cleaning water for various industries, and various industrial products (e.g., coating collars, cutting oils, latexes, synthetic resin emulsions, starch slurries, calcium carbonate slurries, muddy water polymers, heavy oil sludges, metal working oils, fiber oils, paints, antifouling paints, paper coating liquids, ballast water) for preservation, sterilization, or bacteriostasis. Here, examples of microorganisms as a target for the microbicide composition of the invention include various bacteria, yeast, filamentous fungi, or algae.

The addition amount of the composition of the invention upon use may be determined, if appropriate, according to the microorganism level and/or the application target. When used in aqueous dispersions utilized in various industrial fields (e.g., adhesives, resin emulsions, inks, pastes, paints, papers, fibers, and building materials), the component (A) has a concentration of from about 5 to 1000 ppm and more preferably from about 20 to 500 ppm.

EXAMPLES

Next, the invention will be described in more detail with reference to Examples. However, the invention is not limited to these Examples. All formulation amounts are expressed in parts by mass based on the total mass of the composition. In addition, the term "%" refers to mass %.
(CMI Stabilization Test Using Additive)

Example 1

A composition designated in Table 1 was produced using 2,2,6,6-tetramethylpiperidin-1-oxyl as an additive, and stored at 55° C. for 20 days to examine storage stability. The composition was produced by mixing the additive and water, and then adding 5-chloro-2-methyl-4-isothiazolin-3-one (CMI) and 2-methyl-4-isothiazolin-3-one (MI). The stability was visually evaluated with regard to the presence or absence of coloring (coloring from yellow to brown) and precipitation of precipitates.

Example 2

A composition designated in Table 1 was produced using 2,2,6,6-tetramethylpiperidin-1-oxyl as an additive, and stored at 55° C. for 20 days to examine storage stability. The composition was produced by mixing the additive and diethylene glycol, and then adding 5-chloro-2-methyl-4-isothiazolin-3-one (CMI) and 2-methyl-4-isothiazolin-3-one (MI). The stability was visually evaluated with regard to the presence or absence of coloring (coloring from yellow to brown) and precipitation of precipitates.

Example 3

A composition designated in Table 1 was produced using 2,2,6,6-tetramethylpiperidin-1-oxyl as an additive, and stored at 55° C. for 20 days to examine storage stability. The composition was produced by mixing the additive and diethylene glycol monomethyl ether, and then adding 5-chloro-2-methyl-4-isothiazolin-3-one (CMI) and 2-methyl-4-isothiazolin-3-one (MI). The stability was visually evaluated with regard to the presence or absence of coloring (coloring from yellow to brown) and precipitation of precipitates.

Example 4

A composition designated in Table 1 was produced using 2,2,6,6-tetramethylpiperidin-1-oxyl as an additive, and stored at 55° C. for 20 days to examine storage stability. The composition was produced by mixing the additive and diethylene glycol dimethyl ether (diglyme), and then adding 5-chloro-2-methyl-4-isothiazolin-3-one (CMI) and 2-methyl-4-isothiazolin-3-one (MI). The stability was visually evaluated with regard to the presence or absence of coloring (coloring from yellow to brown) and precipitation of precipitates.

Example 5

A composition designated in Table 1 was produced using 2,2,6,6-tetramethylpiperidin-1-oxyl as an additive, and stored at 55° C. for 20 days to examine storage stability. The composition was produced by mixing the additive and polyethylene glycol (with an average molecular weight of 300), and then adding 5-chloro-2-methyl-4-isothiazolin-3-one (CMI) and 2-methyl-4-isothiazolin-3-one (MI). The stability was visually evaluated with regard to the presence or absence of coloring (coloring from yellow to brown) and precipitation of precipitates.

Comparative Examples 1 to 8

Except that each compound designated in the table was used as the additive, the same composition as in Example 1 was produced and substantially the same test as in Example 1 was conducted.

Comparative Examples 9 to 16

Except that each compound designated in the table was used as the additive, the same composition as in Example 2 was produced and substantially the same test as in Example 2 was conducted. Table 1 shows the results of Examples 1 to 5 and Comparative Examples 1 to 16. In this table, "−" indicates that decomposition of CMI was not observed for 20 days or more, and "+" indicates that decomposition of CMI was observed within 20 days.

TABLE 1

| | Additive | Component (mass %) | | | Solvent and Components (mass %) | | Stability Evaluation |
|---|---|---|---|---|---|---|---|
| | | CMI | MI | Additive | | | |
| Example 1 | 2,2,6,6-Tetramethylpiperidin-1-oxyl | 10.5 | 3.5 | 0.1 | Water | 85.9 | − |
| Example 2 | 2,2,6,6-Tetramethylpiperidin-1-oxyl | 10.5 | 3.5 | 0.1 | DEG | 85.9 | − |
| Example 3 | 2,2,6,6-Tetramethylpiperidin-1-oxyl | 10.5 | 3.5 | 0.1 | MDG | 85.9 | − |
| Example 4 | 2,2,6,6-Tetramethylpiperidin-1-oxyl | 10.5 | 3.5 | 0.1 | Diglyme | 85.9 | − |
| Example 5 | 2,2,6,6-Tetramethylpiperidin-1-oxyl | 10.5 | 3.5 | 0.1 | PEG | 85.9 | − |
| Comparative Example 1 | 4-Hydroxy-2,2,6,6-tetramethylpiperidinoxyl | 10.5 | 3.5 | 0.1 | Water | 85.9 | + |
| Comparative Example 2 | 4-Acetamide-2,2,6,6-tetramethylpiperidin-1-oxyl | 10.5 | 3.5 | 0.1 | Water | 85.9 | + |
| Comparative Example 3 | 4-Amino-2,2,6,6-tetramethylpiperidin-1-oxyl | 10.5 | 3.5 | 0.1 | Water | 85.9 | + |
| Comparative Example 4 | 4-Carboxyl-2,2,6,6-tetramethylpiperidin-1-oxyl | 10.5 | 3.5 | 0.1 | Water | 85.9 | + |
| Comparative Example 5 | 3-Carboxyl-2,2,6,6-tetramethylpiperidin-1-oxyl | 10.5 | 3.5 | 0.1 | Water | 85.9 | + |
| Comparative Example 6 | 4-Oxo-2,2,6,6-tetramethylpiperidin-1-oxyl | 10.5 | 3.5 | 0.1 | Water | 85.9 | + |
| Comparative Example 7 | Di-tert-butyl nitroxide | 10.5 | 3.5 | 0.1 | Water | 85.9 | + |
| Comparative Example 8 | 9-Azabicyclo[3.3.1]nonane N-oxyl | 10.5 | 3.5 | 0.1 | Water | 85.9 | + |
| Comparative Example 9 | 4-Hydroxy-2,2,6,6-tetramethylpiperidinoxyl | 10.5 | 3.5 | 0.1 | DEG | 85.9 | + |
| Comparative Example 10 | 4-Acetamide-2,2,6,6-tetramethylpiperidin-1-oxyl | 10.5 | 3.5 | 0.1 | DEG | 85.9 | + |
| Comparative Example 11 | 4-Amino-2,2,6,6-tetramethylpiperidin-1-oxyl | 10.5 | 3.5 | 0.1 | DEG | 85.9 | + |
| Comparative Example 12 | 4-Carboxyl-2,2,6,6-tetramethylpiperidin-1-oxyl | 10.5 | 3.5 | 0.1 | DEG | 85.9 | + |
| Comparative Example 13 | 3-Carboxyl-2,2,6,6-tetramethylpiperidin-1-oxyl | 10.5 | 3.5 | 0.1 | DEG | 85.9 | + |
| Comparative Example 14 | 4-Oxo-2,2,6,6-tetramethylpiperidin-1-oxyl | 10.5 | 3.5 | 0.1 | DEG | 85.9 | + |
| Comparative Example 15 | Di-tert-butyl nitroxide | 10.5 | 3.5 | 0.1 | DEG | 85.9 | + |
| Comparative Example 16 | 9-Azabicyclo[3.3.1]nonane N-oxyl | 10.5 | 3.5 | 0.1 | DEG | 85.9 | + |

CMI: 5-Chloro-2-methyl-4-isothiazolin-3-one
MI: 2-Methyl-4-isothiazolin-3-one
DEG: Diethylene glycol
MDG: Diethylene glycol monomethyl ether (Methyl carbitol)
Diglyme: Diethylene glycol dimethyl ether
PEG: Polyethylene glycol (average molecular weight: 300)

From the results in Table 1, it is clear that CMI is stabilized by 2,2,6,6-tetramethylpiperidin-1-oxyl. Although data is not shown, in the composition of each of Examples 1 to 5, CMI was stable for 1 year or longer at room temperature with an average ambient temperature of 25° C. (To Check Whether Sterilization Efficacy was Equivalent Between Product in the Invention and Commercial CMI Formulation)

Each chemical described below was added to white water (water containing fine fibers) obtained from a certain paper mill so as to have a specified concentration. The chemical was added at a concentration of 2.5 ppm, 5 ppm, 10 ppm, 20 ppm, or 50 ppm. The chemical was brought into contact with white water for a predetermined period. Thereafter, a sample was collected, and the number of viable bacteria was counted by a culture method. The case where a decrease in the bacteria count was detected was evaluated as "−", and the case where no decrease in the bacteria count was detected was evaluated as "+". The culture medium used was a Petri film AC plate (manufactured by Sumitomo 3M Limited), and the culture temperature was 32° C. Table 2 shows the results of Examples 6 and 7, and Comparative Examples 17, 18, 19, and 20.

Example 6

A product in the invention: an aqueous solution containing 10.5% of 5-chloro-2-methyl-4-isothiazolin-3-one (CMI), 3.5% of 2-methyl-4-isothiazolin-3-one (MI), and 0.2% of 2,2,6,6-tetramethylpiperidin-1-oxyl as a stabilizer for CMI.

Example 7

A product in the invention: a diethylene glycol solution containing 10.5% of 5-chloro-2-methyl-4-isothiazolin-3-one (CMI), 3.5% of 2-methyl-4-isothiazolin-3-one (MI), and 0.2% of 2,2,6,6-tetramethylpiperidin-1-oxyl as a stabilizer for CMI.

Comparative Example 17

KATHON-WT (manufactured by Dow DuPont): an aqueous solution containing 13.9% in total of 5-chloro-2-methyl-4-isothiazolin-3-one (CMI) and 2-methyl-4-isothiazolin-3-one (MI), and 28.0% in total of magnesium nitrate and magnesium chloride as stabilizers for CMI.

Comparative Example 18

ZONEN-FP (manufactured by Chemicrea): a solution containing 11.2% of 5-chloro-2-methyl-4-isothiazolin-3-one (CMI), 1.3% of 2-methyl-4-isothiazolin-3-one (MI), and 87.5% of propylene glycol as a stabilizer for CMI.

Comparative Example 19

An aqueous solution containing 0.2% of just 2,2,6,6-tetramethylpiperidin-1-oxyl.

Comparative Example 20

A diethylene glycol solution containing 0.2% of just 2,2,6,6-tetramethylpiperidin-1-oxyl.

TABLE 2

| Concentration of chemical added | Example 6 | Example 7 | Comparative Example 17 | Comparative Example 18 | Comparative Example 19 | Comparative Example 20 |
|---|---|---|---|---|---|---|
| 2.5 ppm | + | + | + | + | + | + |
| 5 ppm | + | + | + | + | + | + |
| 10 ppm | − | − | − | − | + | + |
| 20 ppm | − | − | − | − | + | + |
| 50 ppm | − | − | − | − | + | + |

(Emulsion Shock Test)

The composition of Example 6 or 7 or Comparative Example 17 shown in Table 2 was used to perform an emulsion shock test on a synthetic polymer aqueous dispersion styrene-butadiene polymer latex. About 5 mL of the synthetic polymer aqueous dispersion styrene-butadiene polymer latex or nitrile butadiene rubber latex (4 kinds) was dispensed onto a petri dish, and 4 to 5 drops of the chemical of Example 6 or Example 7 or Comparative Example 17 shown in Table 3 were added thereto. The mixture was then sufficiently stirred with a spoon, and the degree of aggregation was visually evaluated. In this table, "−" indicates that no aggregation occurred, "+" indicates that a small amount of aggregation occurred, and "++" indicates that aggregation was severe.

TABLE 3

| Emulsion | Example 6 | Example 7 | Comparative Example 17 |
|---|---|---|---|
| SB5028 | − | − | + |
| SB1341 | − | − | ++ |
| SBR0591 | − | − | ++ |
| NBR1561 | − | − | ++ |

Tables 1, 2, and 3 have demonstrated that each product in the invention has an excellent microbicidal action by CMI and favorable CMI storage stability, is free of an organic solvent or a harmful substance, causes no emulsion shock, and is thus applicable to a wide range of applications.

Note that in practical use of each product in the invention, there is no problem with the sterilization performance of the chemical and the stability of CMI even for use in the following formulations.

Formulation Example 1

Here, 10 parts of the composition designated in Example 6 is diluted with 90 parts of water. In this case, the CMI concentration is 1.05%, the MI concentration is 0.35%, and the 2,2,6,6-tetramethylpiperidin-1-oxyl concentration is 0.02%.

Formulation Example 2

Here, 50 parts of the composition designated in Example 6 and 50 parts of a commercially available MI 50% preparation (ZONEN-MT, manufactured by Chemicrea) are mixed. In this case, the CMI concentration is 5.25%, the MI concentration is 26.75%, and the 2,2,6,6-tetramethylpiperidin-1-oxyl concentration is 0.1%.

Formulation Example 3

Here, 90 parts of the composition designated in Example 7 is diluted with 10 parts of propylene glycol. In this case, the CMI concentration is 9.45%, the MI concentration is 3.15%, and the 2,2,6,6-tetramethylpiperidin-1-oxyl concentration is 0.18%.

Formulation Example 4

Here, 50 parts of the composition designated in Example 6 and 50 parts of the composition designated in Example 7 are mixed. In this case, the CMI concentration is 10.5%, the MI concentration is 3.5%, and the 2,2,6,6-tetramethylpiperidin-1-oxyl concentration is 0.2%.

(Test for Checking Component a Stability Caused by Component B in Presence of Component E)

Component A-1: (the product of Example 6 in the invention) an aqueous solution containing 10.5° of 5-chloro-2-methyl-4-isothiazolin-3-one (CMI), 3.5% of 2-methyl-4-isothiazolin-3-one (MI), and 0.2% of 2,2,6,6-tetramethylpiperidin-1-oxyl as a stabilizer for CMI.

Component A-2: (the product of Example 7 in the Invention) a diethylene glycol solution containing 10.5% of 5-chloro-2-methyl-4-isothiazolin-3-one (CMI), 3.5% of 2-methyl-4-isothiazolin-3-one (MI), and 0.2% of 2,2,6,6-tetramethylpiperidin-1-oxyl as a stabilizer for CMI.

Component B-1: an aqueous solution containing 0.1% of 2,2,6,6-tetramethylpiperidin-1-oxyl.

Component E-1: an aqueous solution containing one compound selected from the group consisting of 1,2-benzisothiazolin-3-one, 4,5-dichloro-2-n-octyl-4-isothiazolin-3-one, 2-bromo-2-nitropropane-1,3-diol, and 2-(4-thiazolyl)benzimidazole, or an aqueous solution containing ammonium sulfate and sodium hypochlorite.

Example 8

Here, 10 parts of 1,2-benzisothiazolin-3-one (Tokyo Chemical Industry Co., Ltd.), 20 parts of a nonionic surfactant, and 70 parts of ion-exchanged water were mixed to prepare a component E-1. Next, 1 part of component A-1 was added to 198 parts of component B-1, and 1 part of the component E-1 was then added to obtain Example 8. In Example 8, the content of CMI is 525 ppm, the content of 1,2-benzisothiazolin-3-one is 500 ppm, and the content of 2,2,6,6-tetramethylpiperidin-1-oxyl is 0.1%.

Example 9

Except that 10 parts of 4,5-dichloro-2-n-octyl-4-isothiazolin-3-one (Tokyo Chemical Industry Co., Ltd.), 20 parts of a nonionic surfactant, and 70 parts of ion-exchanged water were used as the component E-1, substantially the same procedure as in Example 8 was repeated to prepare an aqueous solution having a CMI content of 525 ppm, a 4,5-dichloro-2-n-octyl-4-isothiazolin-3-one content of 500 ppm, and a 2,2,6,6-tetramethylpiperidin-1-oxyl content of 0.1%.

Example 10

Except that 10 parts of 2-bromo-2-nitropropane-1,3-diol (Chemicrea) and 90 parts of ion-exchanged water were used as the component E-1, substantially the same procedure as in Example 8 was repeated to prepare an aqueous solution having a CMI content of 525 ppm, a 2-bromo-2-nitropropane-1,3-diol content of 500 ppm, and a 2,2,6,6-tetramethylpiperidin-1-oxyl content of 0.1%.

Example 11

Except that 10 parts of 2(4-thiazolyl)benzimidazole (Tokyo Chemical Industry Co., Ltd.), 20 parts of a nonionic surfactant, and 70 parts of ion-exchanged water were used as the component E-1, substantially the same procedure as in Example 8 was repeated to prepare an aqueous solution having a CMI content of 525 ppm, a 2(4-thiazolyl)benzimidazole content of 500 ppm, and a 2,2,6,6-tetramethylpiperidin-1-oxyl content of 0.1%.

Example 12

After 5 parts of ammonium sulfate (KANTO CHEMICAL CO., INC.) was dissolved in 91 parts of ion-exchanged water, 24 parts of sodium hypochlorite aqueous solution (KANTO CHEMICAL CO., INC.) having an effective chlorine concentration of 5.0% was added to obtain a component E-1 (effective chlorine concentration: 1.0%). After 1 part of the component A-1 was added to 189 parts of the component B-1, 10 parts of the above component E-1 was added to obtain Example 12. In Example 12, the content of CMI is 525 ppm, the content of effective chlorine is 500 ppm, and the content of 2,2,6,6-tetramethylpiperidin-1-oxyl is about 0.1%.

Example 13

Except that the component A-2 was used in place of the component A-1, the same composition as in Example 8 was produced as Example 13. In Example 13, the content of CMI is 525 ppm, the content of 1,2-benzisothiazolin-3-one is 500 ppm, and the content of 2,2,6,6-tetramethylpiperidin-1-oxyl is 0.1%.

Example 14

Except that the component A-2 was used in place of the component A-1, the same composition as in Example 9 was produced as Example 14. In Example 14, the content of CMI is 525 ppm, the content of 4,5-dichloro-2-n-octyl-4-isothiazoline-3-one is 500 ppm, and the content of 2,2,6,6-tetramethylpiperidin-1-oxyl is 0.1%.

Example 15

Except that the component A-2 was used in place of the component A-1, the same composition as in Example 10 was produced as Example 15. In Example 15, the content of CMI is 525 ppm, the content of 2-bromo-2-nitropropane-1,3-diol is 500 ppm, and the content of 2,2,6,6-tetramethylpiperidin-1-oxyl is 0.1%.

Example 16

Except that the component A-2 was used in place of the component A-1, the same composition as in Example 11 was produced as Example 16. In Example 16, the content of CMI is 525 ppm, the content of 2-(4-thiazolyl)benzimidazole is 500 ppm, and the content of 2,2,6,6-tetramethylpiperidin-1-oxyl is 0.1%.

Example 17

After 5 parts of ammonium sulfate (KANTO CHEMICAL CO., INC.) was dissolved in 91 parts of ion-exchanged water, 24 parts of sodium hypochlorite aqueous solution (KANTO CHEMICAL CO., INC.) having an effective chlorine concentration of 5.0% was added to obtain a component E-1 (effective chlorine concentration: 1.0%). After 1 part of the component A-2 was added to 189 parts of the component B-1, 10 parts of the above component E-1 was added to obtain Example 17. In Example 17, the content of CMI is 525 ppm, the content of effective chlorine is 500 ppm, and the content of 2,2,6,6-tetramethylpiperidin-1-oxyl is about 0.1%.

Comparative Example 21

To 189.9 parts of ion-exchanged water were added 10 parts of a solution containing 11.2% of ZONEN-FP (manufactured by Chemicrea): 5-chloro-2-methyl-4-isothiazolin-3-one (CMI), 1.3% of 2-methyl-4-isothiazolin-3-one (MI), and 87.5% of propylene glycol as a stabilizer for CMI, and 0.1 parts of 2-bromo-2-nitropropane-1,3-diol (Chemicrea) to give Comparative Example 21. In Comparative Example 21, the content of CMI is 560 ppm, the content of 2-bromo-2-nitropropane-1,3-diol is 500 ppm, and 2,2,6,6-tetramethylpiperidin-1-oxyl is not included.

The composition of each of Examples 8 to 17 in the invention or the composition of Comparative Example 21 was stored under conditions at a temperature of 55° C. for 40 days to evaluate the storage stability. Table 4 lists the evaluation results of Examples 8 to 17 and Comparative Example 21. The stability was visually evaluated with regard to the presence or absence of coloring (coloring from yellow to brown) and precipitation of precipitates. In Table 4, "−" indicates that the composition was found to have neither coloring nor precipitation due to decomposition of CMI, and "+" indicates that the composition was found to have coloring and/or precipitation due to decomposition of CMI.

TABLE 4

| | |
|---|---|
| Storage period | 40 days |
| Storage temperature | 55° C. |
| Example 8 | − |

TABLE 4-continued

| | |
|---|---|
| Example 9 | − |
| Example 10 | − |
| Example 11 | − |
| Example 12 | − |
| Example 13 | − |
| Example 14 | − |
| Example 15 | − |
| Example 16 | − |
| Example 17 | − |
| Comparative Example 21 | + |

Table 4 has revealed that CMI is stabilized by 2,2,6,6-tetramethylpiperidin-1-oxyl in a composition containing CMI and a component(s) conventionally used as a microbicide.

The invention claimed is:

1. A microbicide composition comprising: (A) 5-chloro-2-methyl-4-isothiazolin-3-one; (B) 2,2,6,6-tetramethylpiperidin-1-oxyl; and (C) at least one solvent selected from the group consisting of water and a hydrophilic organic solvent, wherein the component (A) has a content of from 0.0005 to 13 mass %, the component (B) has a content of from 0.000005 to 1.5 mass %, and the component (C) has a content of from 70 to 99.9995 mass %.

2. The microbicide composition according to claim 1, further comprising (D) 2-methyl-4-isothiazolin-3-one.

3. The microbicide composition according to claim 1, further comprising (E) at least one component selected from the group consisting of 1,2-benzisothiazolin-3-one, 2-n-octyl-4-isothiazolin-3-one, N-n-butyl-1,2-benzisothiazolin-3-one, 4,5-dichloro-2-n-octyl-4-isothiazolin-3-one, 2-bromo-2-nitropropane-1,3-diol, 2,2-dibromo-3-nitrilopropionamide, 2,2-dibromo-2-nitroethanol, 3-iodo-2-propynyl N-butylcarbamate, methylene dithiocyanate, 4,5-dichloro-3H-1,2-dithiol-3-one, 1,2-bis(bromoacetoxy)ethane, 1,4-bis(bromoacetoxy)-2-butene, 1,2-bis(bromoacetoxy)propane, 2-(4-thiazolyl)benzimidazole, 2-(methoxycarbonylamino)-1H-benzimidazole, 1,3-bis(hydroxymethyl)-5,5-dimethylhydantoin, 1-bromo-3-chloro-5,5-dimethylhydantoin, 2-mercaptopyridine N-oxide zinc salt, 2-mercaptopyridine N-oxide sodium salt, glutaraldehyde, orthophthalaldehyde, hydrazine, α-chlorobenzaldehyde oxime, dichloroglyoxime, 1,3,5-triazin-1,3,5(2H,4H,6H)-tris(ethanol), maleimide, 3,3,4,4-tetrachlorotetrahydrothiophen-1,1-dioxide, benzalkonium chloride, a combination of ammonium sulfate and sodium hypochlorite, a combination of ammonium sulfate and potassium hypochlorite, a combination of ammonium bromide and sodium hypochlorite, a combination of ammonium bromide and potassium hypochlorite, benzoic acid, salicylic acid, and dehydroacetic acid.

4. The microbicide composition according to claim 2, wherein the component (D) has a content of from 0.0001 to 50 mass %.

5. A stabilizer for a composition comprising 5-chloro-2-methyl-4-isothiazolin-3-one and at least one solvent selected from the group consisting of water and a hydrophilic organic solvent, the stabilizer comprising 2,2,6,6-tetramethylpiperidin-1-oxyl as an active ingredient,
wherein the 5-chloro-2-methyl-4-isothiazolin-3-one has a content of from 0.0005 to 13 mass %, the 2,2,6,6-tetramethylpiperidin-1-oxyl has a content of from 0.000005 to 1.5 mass %, and the at least one solvent has a content of from 70 to 99.9995 mass %.

6. The stabilizer according to claim 5, wherein the composition further comprises 2-methyl-4-isothiazolin-3-one.

7. A method for stabilizing a composition comprising 5-chloro-2-methyl-4-isothiazolin-3-one and at least one solvent selected from the group consisting of water and a hydrophilic organic solvent, the method comprising adding 2,2,6,6-tetramethylpiperidin-1-oxyl to the composition,
wherein the 5-chloro-2-methyl-4-isothiazolin-3-one has a content of from 0.0005 to 13 mass %, the 2,2,6,6-tetramethylpiperidin-1-oxyl has a content of from 0.000005 to 1.5 mass %, and the at least one solvent has a content of from 70 to 99.9995 mass %.

8. The stabilization method according to claim 7, wherein the composition further comprises 2-methyl-4-isothiazolin-3-one.

9. A microbicidal method comprising adding the microbicide composition according to claim 1 to a microbicide target.

10. The microbicidal method according to claim 9, wherein the added amount is an amount provided such that the component (A) has a concentration of from 5 to 1000 ppm in the microbicide composition.

* * * * *